Patented June 1, 1926.

1,586,869

UNITED STATES PATENT OFFICE.

JOHN A. WESENER, OF CHICAGO, ILLINOIS.

CEREAL-FOOD PRODUCT AND METHOD OF PREPARING SAME.

No Drawing. Application filed March 24, 1924, Serial No. 701,586. Renewed March 8, 1926.

My invention relates to a cooked or partly cooked and dried or parched cereal food product, that is to say, a grain subjected to heat and moisture and subsequently dried, and to a novel process or method of preparing a food product of this type.

One of the objects of the invention is to provide certain novel treatments of the grain whereby the tendency to rancidity in the product is prevented and a particularly agreeable flavor is imparted thereto.

A further object is to provide certain novel methods of treating the grain in its natural state, that is, without removal of the husks or hulls so that during the process of treatment the kernel is protected and kept uninjured and integral, and an additional and desirable flavor is thereby imparted to the product. The product resulting from the treatments given to it in accordance with my invention has certain characteristics which are valuable and which, so far as I am aware, are novel. The kernels after the treatment contemplated by the invention may be granulated or flaked and used as a food product either with or without further cooking.

When grains are subjected to heat, for example, in steam cooking or in drying or parching, the fatty oil in the grain undergoes hydrolysis or decomposition which gives the product a more or less rancid flavor. This decomposition of the fatty element, and consequent rancidity, results from the presence in the grain of certain acids, some of which, such as phytic acids, are found in all grains, and others of which are developed by ripening and fermentation. The acids, in the presence of heat, act upon the fat in the kernel decomposing it, wholly or in part, so that fatty acids and possibly other products are split off which, through oxidation or otherwise, give rise to the objectionable rancidity.

To overcome this I ascertain the degree of acidity of the grain, that is to say, its hydrogen ion concentration, and treat the grain with a sufficient quantity of a suitable alkali or alkaline earth, or equivalent substance, to substantially neutralize the acid. The hydrogen ion concentration may either be determined analytically, in which case the acid developed during the process of preparing the cereal product may be taken into account, whereupon the quantity of the neutralizing agent per unit quantity of the cereal may be readily determined or the amount of such neutralizing agent may be determined empirically by making experimental trials with different batches of the grain.

The process may be employed for the treatment of any of the common cereals, such as oats, corn, wheat and rye. I may use as neutralizing agents solutions of any suitable alkali or alkaline earth such as calcium hydrate. With neutralizing agents which are strong electrolytes such, for example, as sodium carbonate, it is preferable not to attempt to produce complete neutralization since with these agents over treatment is likely to give rise to certain decompositions in the product which are detrimental to its use as a food, consequently it is safer, out of abundance of caution, to keep the cereal slightly on the acid side. With other neutralizing agents, such as calcium hydrate, excess of the alkali gives no detrimental results so that the acids in the grain may be completely neutralized. However in this case the product will not be alkaline. If there be any excess of lime it will form a salt with the carbon dioxide in the atmosphere.

The grain may be treated with the solution of the neutralizing agent either before or during or after the cooking step, but it is preferable to so treat the grain before cooking.

After the grain has been cooked under steam pressure and the natural and developed acids therein neutralized, it is subjected to attrition under conditions which open up or rupture the hulls or husks without any substantial disintegration of the kernels. The previous treatment of the grain which brings about a more or less rubbery condition of the kernel makes this entirely fesible. The grain is then dried or parched with the hulls ruptured but not removed to any considerable extent. This drying with the hulls or husks results in imparting an agreeable flavor to the grain. After drying the hulls may be removed by any suitable milling process. The removal can be accomplished with minimum damage to the kernel. The kernel may then be put into any desired form. It may be flaked, for example, or broken or cut up into smaller particles. In this condition it may be used as a food either with or without cooking.

To take a specific example as applied to oats for which the process has a particular utility: The oats in the natural state without removal of the hulls, are mixed with a water solution of calcium hydrate in the proportion of one and one-half parts of the solution to one part of grain. The alkalinity of the solution will vary, as stated, in accordance with the acidity or prospective acidity of the grain. The product may be slightly acid but is preferably not alkaline to any appreciable extent for the reasons stated.

The grain is then cooked at a steam pressure of fifteen pounds, more or less, for a period of from thirty to forty-five minutes. As the pressure is increased the duration of the cooking may be diminished.

After the grain is sufficiently cooked without destroying the integrity of the kernels it is run through corrugated rolls, preferably rolls running at different speeds, for the purpose of rupturing or opening the hulls or husks of the grain. This operation can be accomplished with but little breaking of or injury to the kernels, because of the rubber-like condition of the kernels resulting from the previous treatment of the grain, and without removing the hulls to any great extent.

The kernels and hulls are now subjected to a drying or parching operation, the hulls protecting the kernels against injury through overheating or by attrition. Moisture is removed from the grain, an agreeable flavor imparted thereto, and the grain is hardened. After the grain has been dried in this manner it is milled to remove the hull, for example, by means of the ordinary scouring machine. No difficulty is experienced in removing the hull without damaging the kernel. The material is then winnowed to remove the hulls and the groats are preferably scrubbed to remove fibres and the fibres blown out.

The subsequent treatment of the oats will depend upon the product desired. It is possible because of the flinty character of the kernels to break the material up into granular or gritty form. This can be done by passing the oats through corrugated milling rolls adjusted to give the required degree of fineness. Oat grits have not been heretofore produced, so far as I am aware, because of the difficulty of giving the kernels the necessary dense and flinty texture without at the same time producing undesirable rancidity and because of the chalky and friable nature of the ordinary dried groats. The grits when cooked will remain segregated instead of cooking into a mush.

To make oat flakes the groats will be steamed to soften them and then rolled in the usual manner. Such flakes, however, will be found to have a more agreeable flavor than the ordinary rolled oats and can be cooked very rapidly.

A cake or biscuit can be made by pressing together the flakes while in a soft and moist state.

One of the important advantages of the process is the simplification of apparatus and of handling which results from the toughening of the grain by the cooking step which makes it possible, for oats especially, to use simple and rapid milling operations that cannot be used while the oats are in a green or merely a dried state. The operation of disrupting without removing the hulls is in particular much simpler and more economical than the heretofore employed method of clipping off the ends of the husks.

By the term "natural and developed acids" I intend such acids, including fatty acids, as are found generally in cereal grains together with any acids which may be developed in the maturing of the grain through fermentation or in the process of cooking and drying. Any fatty acids preformed in the grain are changed into neutral soaps.

It is realized that the method described may be modified in certain respects without departure from the principles of the invention, hence I intend to cover all modifications within the scope of the appended claims. For example, the grain could be subjected to a malting operation before it is treated in accordance with my process.

I claim:

1. Cooked oats the natural and developed acids of which are substantially neutralized and which contain substantially no excess of alkaline substance.

2. Cooked oat groats having their kernel structure unimpaired, with the natural and developed acids substantially neutralized and containing substantially no excess of alkaline substance.

3. Cooked oats which are flinty in character, with the natural and developed acids substantially neutralized and containing substantially no excess of alkaline substance.

4. Method of treating oats which consists in cooking the oats and neutralizing the natural and developed acids therein without bringing about alkalinity in the product.

5. Method of treating oats which consists in cooking the oats and neutralizing the natural and developed acids therein without bringing about alkalinity in the product, and without impairing the integrity of the kernel.

6. Method of treating oats which consists in cooking the oats, neutralizing the natural and developed acids and drying the same without removal of the hulls.

7. Method of treating oats which consists in cooking the oats, neutralizing the natural and developed acids and drying the oats without removal of the hulls and without impairment of the integrity of the kernel.

8. Method of treating oats which consists in cooking the oats, neutralizing the natural and developed acids, drying the oats without removal of the hulls and without impairment of the integrity of the kernel, and removing the hulls from the unbroken kernels.

9. Method of treating oats which consists in cooking the oats unhulled, neutralizing the natural and developed acids, without bringing about alkalinity in the product, rupturing the hulls without removing same, all without destroying the integrity of the kernel, and then drying the oats and removing the hulls.

10. Method of preparing a cereal food product which comprises cooking unhulled grain, subjecting the grain to attrition to rupture the hulls without disintegrating the kernels, and then parching or drying the material.

11. Method of preparing a cereal food product which comprises cooking unhulled grain, neutralizing the natural and developed acids in the grain, subjecting the grain to attrition to rupture the hulls without disintegrating the kernels, then parching or drying the material.

12. Method of treating grain which consists in subjecting the grain unhulled to heat and moisture to toughen the kernel, then treating the grain to disrupt the hull without removing the same or breaking the kernel.

13. Method of treating oats which comprises cooking the oats unhulled in the presence of a neutralizing agent, disrupting the hulls without removing the same or breaking the kernels, and then drying or parching the material.

JOHN A. WESENER.